United States Patent
Itoi et al.

(10) Patent No.: US 9,105,137 B2
(45) Date of Patent: Aug. 11, 2015

(54) MINING MACHINE INFORMATION COLLECTION SYSTEM

(75) Inventors: Takashi Itoi, Hiratsuka (JP); Tadashi Taninaga, Fujisawa (JP); Hisataka Fukasu, Fujisawa (JP); Takahiro Ueda, Maebashi (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/824,800

(22) PCT Filed: Sep. 13, 2012

(86) PCT No.: PCT/JP2012/073540
§ 371 (c)(1),
(2), (4) Date: Aug. 29, 2013

(87) PCT Pub. No.: WO2013/065411
PCT Pub. Date: May 10, 2013

(65) Prior Publication Data
US 2014/0229055 A1    Aug. 14, 2014

(30) Foreign Application Priority Data
Nov. 4, 2011    (JP) ................................ 2011-242844

(51) Int. Cl.
*G07C 5/00* (2006.01)
*H04Q 9/00* (2006.01)

(52) U.S. Cl.
CPC .................. *G07C 5/008* (2013.01); *H04Q 9/00* (2013.01); *H04Q 2209/40* (2013.01)

(58) Field of Classification Search
CPC ......... H04Q 9/00; H04Q 2209/40; G07C 5/08
USPC ...................................................... 701/1, 31.5
See application file for complete search history.

(56) References Cited

U.S. PATENT DOCUMENTS

| 2002/0165645 A1 * | 11/2002 | Kageyama ........................ 701/1 |
| 2004/0040792 A1 * | 3/2004 | Uranaka et al. ............... 187/382 |
| 2009/0299562 A1 * | 12/2009 | Sudou et al. .................... 701/25 |

FOREIGN PATENT DOCUMENTS

| CN | 1480812 A | 3/2004 |
| CN | 1526596 A | 9/2004 |

(Continued)

OTHER PUBLICATIONS

International Search Report dated Dec. 11, 2012, issued for PCT/JP2012/073540 (in Japanese language).

*Primary Examiner* — Fadey Jabr
*Assistant Examiner* — Yazan A Soofi
(74) *Attorney, Agent, or Firm* — Locke Lord LLP

(57) ABSTRACT

An information collection device of an information collection system of a mining machine collects operation information from the dump truck. The information collection device transmits a position information request command to request the transmission of position information about the dump truck through a second wireless communication device at a predetermined time. When the dump truck whose response to the position information request command is received by the second wireless communication device can stay in the communication range of an in-vehicle wireless communication device until the communication of the operation information of the dump truck ends, the information collection device collects the operation information of the dump truck whose response is received by the second wireless communication device.

9 Claims, 12 Drawing Sheets

(56) References Cited

FOREIGN PATENT DOCUMENTS

| | | |
|---|---|---|
| JP | 2004-102322 A | 4/2004 |
| JP | 2004-165755 A | 6/2004 |
| JP | 2008-011039 A | 1/2008 |
| JP | 2008-011077 A | 1/2008 |
| JP | 2008-129815 A | 6/2008 |
| JP | 2010-170322 A | 8/2010 |
| WO | WO-2004068438 A1 | 8/2004 |

* cited by examiner

FIG.6

| STATE OF DUMP TRUCK | DETERMINATION METHOD |
|---|---|
| STOP | VEHICLE SPEED IS 0 |
| LOADING | VEHICLE SPEED IS 0 AND LOAD CALCULATING DEVICE DETECTS THAT LOAD INCREASES |
| UNLOADING | VEHICLE SPEED IS 0 AND LOAD CALCULATING DEVICE DETECTS THAT LOAD DECREASES |
| FUEL SUPPLY | VEHICLE SPEED IS 0, FUEL SENSOR TRANSMITS PREDETERMINED SIGNAL, AND DUMP TRUCK IS LOCATED IN GAS STATION |

FIG.10

| | MOVING PATH INFORMATION | ALLOWABLE STAY TIME |
|---|---|---|
| CASE 1 | A(X,Y)1, A(X,Y)2, ·····A(X,Y)f | TAf |
| CASE 2 | B(X,Y)1, B(X,Y)2 | - |
| CASE 3 | C(X,Y)1, C(X,Y)2 | TC1 |
| CASE 4 | A(X,Y)1, A(X,Y)2, ·····A(X,Y)f | - |
| CASE 5 | A(X,Y)1, A(X,Y)2 | - |
| CASE 6 | A(X,Y)1, A(X,Y)2, ·····A(X,Y)n | TAn |
| . | . | . |
| . | . | . |

MINING MACHINE INFORMATION COLLECTION SYSTEM

FIELD

The present invention relates to a technique for collecting operation information about a mining machine.

BACKGROUND

Various kinds of construction machines, such as an excavator and a dump truck, operate in a civil engineering site or a mine, such as a quarry. In recent years, a technique has been proposed which acquires operation information about the construction machine using wireless communication and manages the operation state of the construction machine. For example, Patent Literature 1 discloses a technique which wirelessly transmits data for a vehicle to a management center. The technique acquires the state of wireless communication lines at the current position of the vehicle from a line state map in which the state of the wireless communication lines at a plurality of points is recorded and determines whether to wirelessly transmit data for the vehicle using a communication means.

CITATION LIST

Patent Literature

Patent Literature 1: Japanese Patent Application Laid-open No. 2008-011039

SUMMARY

Technical Problem

When the operation information is collected and stored in a storage device of each construction machine and, for example, a service man accesses each construction machine and downloads the operation information, an operation of downloading the operation information from a plurality of construction machines is complicated and a real-time property is insufficient in the management of the operation information. Therefore, a wireless communication means is used to acquire the operation information about each construction machine. When a mine is considered as a place where the construction machines operate, it is necessary to install a plurality of repeaters for receiving the operation information stored in the construction machine (mining machine), such as a dump truck, using wireless communication, separately from a management facility in which a management device is provided since the mine is generally vast. However, even when the plurality of repeaters is used, it is difficult to reliably ensure communication between the mining machine and the repeaters in the entire area of the mine. As a result, a region in which communication is available and a region in which communication is unavailable are formed between the mining machine and the repeater.

In a case in which the mining machine transmits the operation information to the management facility in which the management device is provided while is traveling, the mining machine is in the communication range when communication starts, but deviates from the communication range in the middle of communication. As a result, the operation information may not be transmitted and received. The mining machine in which the transmission and reception of the operation information are interrupted needs to retransmit the operation information. As a result, the collection efficiency of the operation information by the management device is reduced. The problems unique to the mine are not disclosed in Patent Literature 1 and need to be solved.

An object of the invention is to prevent the interruption of communication when operation information about a mining machine is collected by wireless communication and reliably collect the operation information.

Solution to Problem

According to the present invention, a mining machine information collection system comprises: an in-vehicle information collection device that is provided in a mining machine and collects operation information about an operation state of the mining machine; a position information detecting device that is provided in the mining machine and detects position information about a position of the mining machine; a first wireless communication device that is provided in the mining machine and performs communication; and an information collection device that collects the operation information through a second wireless communication device which communicates with the first wireless communication device, wherein the information collection device transmits a position information request command to request a transmission of the position information of the mining machine through the second wireless communication device at a predetermined time, and when the mining machine whose response to the position information request command is received by the second wireless communication device can stay in a communication range of the first wireless communication device until a communication of the operation information of the mining machine ends, the information collection device collects the operation information of the mining machine whose response is received.

In the present invention, it is preferable that the information collection device determines whether the mining machine whose response is received can stay in the communication range until the communication of the operation information of the mining machine ends, based on the position information, a speed and a traveling direction of the mining machine whose response is received of the mining machine, communication time of the operation information, and position information about the communication range.

In the present invention, it is preferable that when receiving information indicating that the mining machine is stopped in the communication range and a place where a wireless communication facility for receiving the operation information is prepared from the in-vehicle information collection device, the information collection device does not perform the determination and collects the operation information of the mining machine stopped in the place where the wireless communication facility is prepared.

According to the present invention, a mining machine information collection system comprises: an in-vehicle wireless communication device that is provided in a mining machine and performs communication; an in-vehicle storage device that stores a communication range of the in-vehicle wireless communication device; a position information detecting device that is provided in the mining machine and detects position information about a position of the mining machine; an in-vehicle information collection device that is provided in the mining machine and collects operation information about an operation state of the mining machine; and an information collection device that collects the operation information, wherein the in-vehicle information collection device transmits the operation information to the information collection device through the in-vehicle wireless communication device when the mining machine can stay in a communication range of the in-vehicle wireless communication device until a communication of the operation information ends.

In the present invention, it is preferable that the in-vehicle information collection device determines whether the mining machine can stay in the communication range until the communication of the operation information ends, based on the position information, a speed and a traveling direction of the mining machine, communication time of the operation information, and position information about the communication range.

In the present invention, it is preferable that the in-vehicle storage device stores a moving path of the mining machine when the operation information is transmitted as an operation information transmittable path in association with a time when the mining machine can stay in the communication range, and when the mining machine enters the communication range while moving along the operation information transmittable path, the in-vehicle information collection device determines whether the mining machine can stay in the communication range until the communication of the operation information ends, based on the time when the mining machine can stay and communication time of the operation information.

In the present invention, it is preferable that when the mining machine is stopped in the communication range and a place where a wireless communication facility for receiving the operation information is prepared, the in-vehicle information collection device transmits the operation information without performing the determination.

In the present invention, it is preferable that it is determined whether the mining machine is stopped in the place where the wireless communication facility is prepared based on at least one of a state of the speed of the mining machine and a change in an amount of freight loaded in the mining machine.

Advantageous Effects of Invention

According to the invention, it is possible to prevent the interruption of communication when operation information about a mining machine is collected by wireless communication and reliably collect the operation information.

BRIEF DESCRIPTION OF DRAWINGS

FIG. 6 is a table illustrating the correspondence between the state of the dump truck and a method of determining the state.

FIG. 10 is a diagram illustrating an example of a data table in which moving path information about the history of a moving path is associated with the time when a dump truck can stay in a communication range corresponding to the history of the moving path.

DESCRIPTION OF EMBODIMENTS

Hereinafter, embodiments of the invention will be described in detail with reference to the accompanying drawings. The invention is not limited by the content of the following embodiments. The following components include components which can be conceived by those skilled in the art and substantial equivalents. In addition, the following components may be appropriately combined with each other. Furthermore, the components may be omitted, replaced, or changed in various ways, without departing from the scope and spirit of the invention.

First Embodiment

Figure 1:
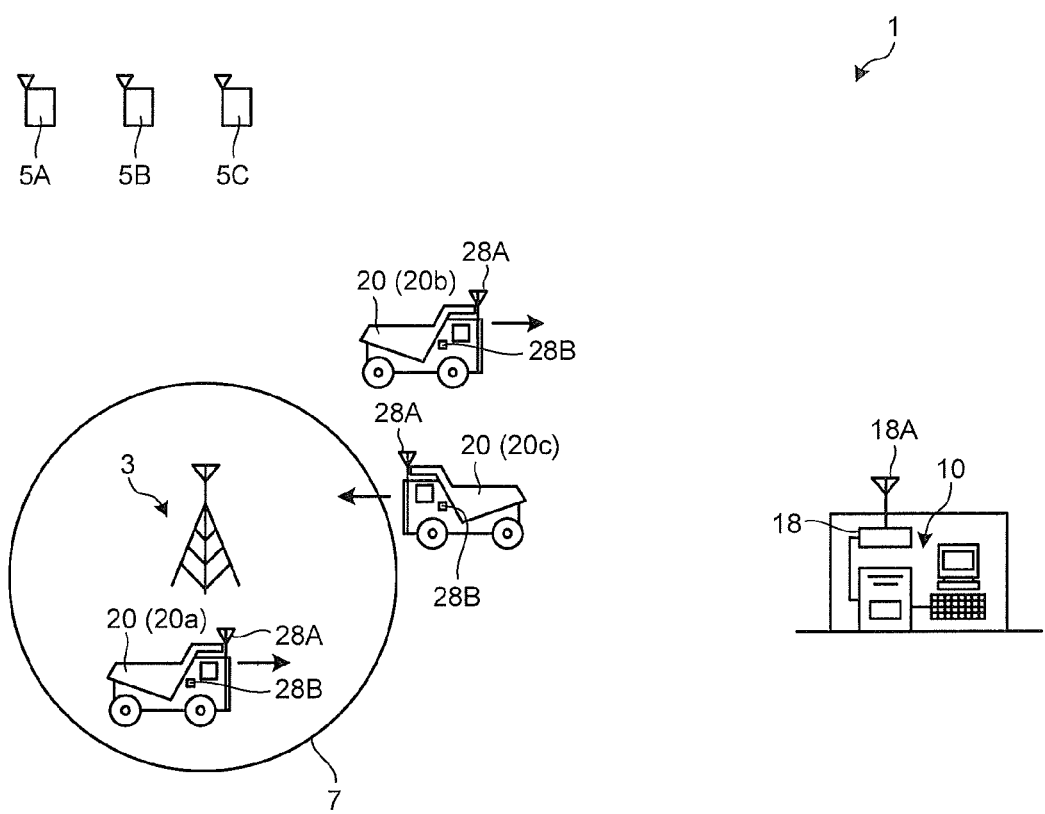
FIG. 1 is a diagram illustrating a site to which an information collection system of a mining machine according to a first embodiment is applied.

FIG. 1 is a diagram illustrating a site to which a system for collecting information about a mining machine according to a first embodiment is applied. The mining machine is a general term of machinery which is used in various kinds of operations in a mine. In this embodiment, as a truck, which is a kind of the mining machine, a dump truck 20 is used as an example of a carrier which carries broken stones, or earth and sand or rocks generated when the broken stones are drilled, but is not limited thereto. For example, the mining machine according to this embodiment may be an excavator, an electric shovel, or a wheel loader serving as a drilling machine which drills, for example, broken stones.

<Outline of Mining Machine Information Collection System>

In a mining machine information collection system (hereinafter, referred to as an information collection system, if necessary) 1, an information collection device 10 collects information about the operation of the dump truck 20 serving as a mining machine from the dump truck 20 using wireless communication. The information collection device 10 is a kind of mining machine which is provided in, for example, a mine management facility and a management device which manages the operation of the mine, unlike the dump truck 20, which is a moving body. As such, in principle, the movement of the information collection device 10 is not considered. The information about the operation of the dump truck 20 which is collected by the information collection device 10 is information about the operation state of the dump truck 20 and includes, for example, a traveling time, the distance traveled, an engine temperature, the presence or absence of errors, a place where an error occurs, a fuel consumption rate, and load capacity. The operation information is mainly used for the preventive maintenance of the dump truck 20 or to diagnose the malfunctions of the dump truck 20. Therefore, the operation information is useful to respond to needs for an improvement in the productivity of the mine or an improvement in the operation of the mine.

The information collection device 10 collects the information about the operation of the dump truck 20 which operates in the mine. Therefore, the information collection device 10 is connected to a second wireless communication device 18 including an antenna 18A. The dump truck 20 includes an antenna 28A in order to transmit the operation information or communicate with the information collection device 10. In addition, the dump truck 20 can receive radio waves from GPS (Global Positioning System: omni-directional positioning system) satellites 5A, 5B, and 5C using a GPS antenna 28B and measure its own position.

The power of the radio wave transmitted from the antenna 28A of the dump truck 20 is not in a communication range capable of covering the entire region of the mine. In addition, the radio wave transmitted from the antenna 28A may not be transmitted far over the obstacle, for example, a high mountain from the relationship with the wavelength. Of course, when a communication device capable of transmitting a high-power radio wave is used, the communication range is widened and it is possible to remove the area in which communication is unavailable. However, since the mine is vast, a wireless system which can form an information communication network in a limited range, such as a wireless LAN (Local Area Network), is used in order to correspond to a situation in which it is necessary to prevent an increase in the costs of a repeater or a communication device or it is not expected to ensure a communicate infrastructure according to a region in which there is a mine. According to, for example, a wireless LAN, it is possible to achieve mutual communication between the mining machine and the management facility (information collection device 10) at a low cost, but it is necessary to solve the problem of a communication failure. The range of the radio wave transmitted from the antenna 28A of the dump truck 20 is limited. Therefore, when the distance between the dump truck 20 and the information collection device 10 increases or when there is a mountain therebetween, the second wireless communication device 18 may not receive the radio wave from the dump truck 20. Therefore, an information collection system 1 includes a repeater 3 that relays the radio wave transmitted from the antenna 28A of the dump truck 20 to the second wireless communication device 18. The repeater 3 enables the information collection device 10 to collect the operation information from the dump truck 20 which operates at a position away from the information collection device 10 using wireless communication.

A predetermined area (a circular area in FIG. 1) around the place where the repeater 3 is provided is a range in which an in-vehicle wireless communication device 27 (first wireless communication device) of the dump truck 20 wirelessly communicates with the repeater 3, that is, a communication range 7. In this example, a circle with a radius R having the repeater 3 as the center is the communication range 7. The shape of the communication range 7 is not necessarily a circle, but may vary depending on, for example, the relationship with another repeater 3 or topography. A dump truck 20c travels in a direction (from the outside to the inside of the communication range 7) represented by an arrow in FIG. 1. A dump truck 20a in the communication range 7 can communicate with the second wireless communication device 18 through the repeater 3. In some cases, it is difficult for the dump truck 20a in the communication range 7 to communicate with the second wireless communication device 18 according to the relationship between the amount of data in the operation information to be transmitted and a vehicle speed (speed). For example, when the amount of data is large and the speed of the dump truck 20a is high, the dump truck 20a is likely to get out of the communication range 7 before data communication ends and may not communicate with the second wireless communication device 18.

A dump truck 20b which is traveling beyond the communication range 7 is traveling beyond the communication range of the in-vehicle wireless communication device 27. Therefore, the dump truck 20b may not communicate with the second wireless communication device 18 through the repeater 3. Similarly, the dump truck 20c which is traveling beyond the communication range 7 is traveling toward the communication range 7. Therefore, the dump truck 20c may not communicate with the second wireless communication device 18 now. However, when the dump truck 20c continues to travel toward the communication range 7, it can communicate with the second wireless communication device 18. The information collection system 1 achieves stable and reliable wireless communication between the in-vehicle wireless communication device 27 of the dump truck 20 and the second wireless communication device 18, considering, for example, the intensity of radio waves, the vehicle speed, and the amount of data, and reliably and effectively collects the information about the operation of the dump truck 20. Next, the information collection device 10 will be described in detail.

<Information Collection Device>

Figure 2:
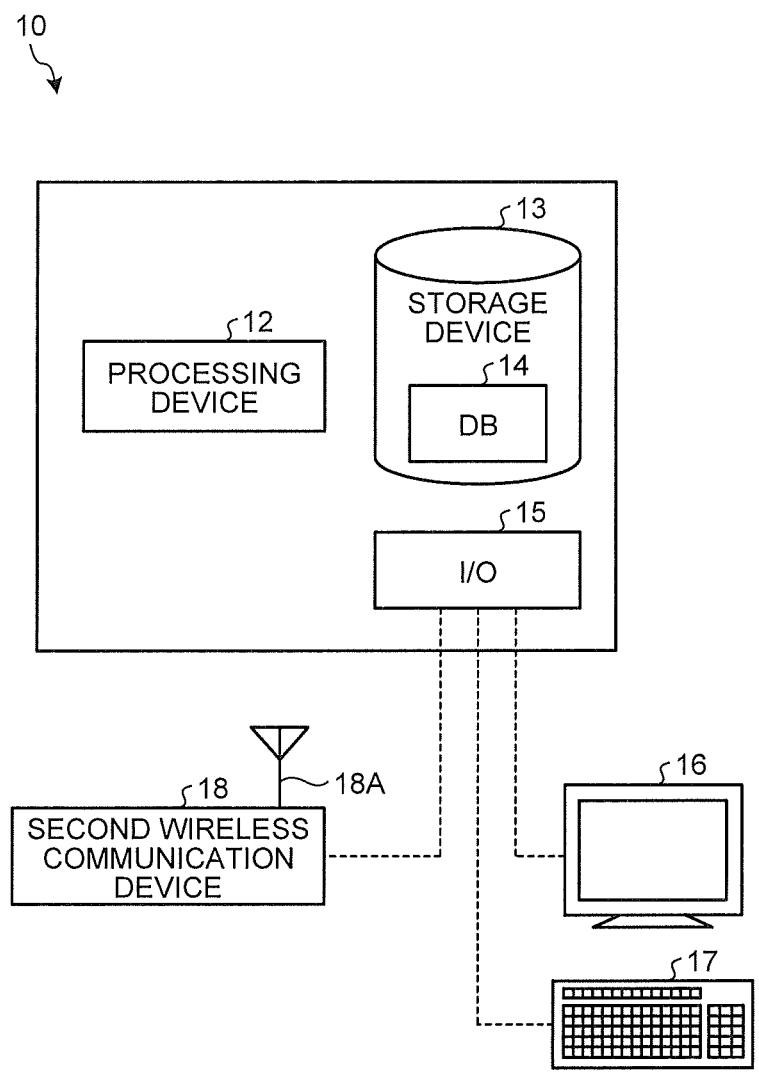
FIG. 2 is a functional block diagram illustrating an information collection device provided in the information collection system of the mining machine according to the first embodiment.

FIG. 2 is a functional block diagram illustrating the information collection device 10 provided in the information collection system of the mining machine according to the first embodiment. The information collection device 10 includes a processing device 12, a storage device 13, and an input/output unit (I/O) 15. A display device 16, an input device 17, and the second wireless communication device 18 are connected to the input/output unit 15 of the information collection device 10. The information collection device 10 is, for example, a computer. The processing device 12 is, for example, a CPU (Central Processing Unit). The storage device 13 is, for example, a RAM (Random Access Memory), a ROM (Read Only Memory), a flash memory, a hard disk drive, or combinations thereof. The input/output unit 15 is used for the input and output (interface) of information between the processing device 12, and the display device 16, the input device 17, and the second wireless communication device 18 which are connected to the outside of the processing device 12.

The storage device 13 includes, for example, a communication range database (DB) 14 that stores an operation information collection computer program for collecting the operation information about the dump truck 20 and the communication range 7 between the in-vehicle wireless communication device 27 (first wireless communication device) of the dump truck 20 and each repeater 3. The communication range database 14 is position information about the range in which the in-vehicle wireless communication device 27 of the dump truck 20 can communicate with the repeater 3 and is described by, for example, a set of a plurality of coordinates for each repeater 3.

For example, it is assumed that the inside of a circle with a radius R having the repeater 3 illustrated in FIG. 1 as the center is the communication range 7. When an X-Y coordinate system having the position of the repeater 3 as the origin is considered, the communication range 7 is represented by $X^2+Y^2 \leq R^2$. The communication range 7 can be calculated by measurement using, for example, a measurement device which can measure the intensity of radio waves. In addition, the communication range 7 can be calculated from the specifications of the repeater 3 and the in-vehicle wireless communication device 27. The communication range 7 may be calculated by a combination of the measurement and the specifications of the in-vehicle wireless communication device 27. A place where the repeater 3 is provided is measured by, for example, a GPS sensor in advance and data indicating the place is stored in the communication range database 14.

When the information collection device 10 collects the operation information about the dump truck 20, the processing device 12 performs, for example, the following process. First, the information collection device 10 transmits a position information request command (referred to as a broadcast, if necessary) to request the transmission of the position information about the dump truck 20 through the second wireless communication device 18 at a predetermined time (predetermined cycle). Among a plurality of dump trucks 20 which operate in the mine, the dump truck 20 which has received the broadcast transmits a response to a neighboring repeater 3. Information in the response includes at least information about the position of the dump truck 20, the vehicle speed (speed), and the traveling direction. In addition, the response may include at least one of identifiers for identifying the plurality of dump trucks 20 and time information about the response. The second wireless communication device 18 receives the response through the repeater 3 and the processing device 12 and it can be determined that the dump truck 20 whose operation information is acquired stays in the communication range 7 at the time when the second wireless communication device 18 receives the response (the time when the dump truck 20 transmits the response). The processing device 12 determines whether the dump truck 20 which has transmitted the response to the broadcast to the second wireless communication device 18 can stay in the communication range 7 until the communication of the operation information for the dump truck 20 ends. The processing device 12 determines whether the dump truck 20 can stay in the communication range 7 until the communication of the operation information for the dump truck 20 ends, on the basis of, for example, information about the position of the dump truck 20, the speed and traveling direction of the dump truck 20, the time required for the communication of the operation information to be transmitted (operation information communication time), and position information about the communication range 7. When the dump truck 20, which is a determination target, can stay in the communication range 7 until the communication of the operation information for the dump truck 20 ends, the processing device 12 collects the operation information about the dump truck 20 whose response is received, that is, the dump truck 20 which is a determination target.

For example, commands for implementing the above-mentioned process are described in the operation information collection computer program. When the information collection device 10 collects the operation information for the dump truck 20, the processing device 12 reads the operation information collection computer program and the communication range database 14 from the storage device 13, executes the commands described in the operation information collection computer program to collect the operation information about the dump truck 20, and stores the operation information in the storage device 13.

The display device 16 is, for example, a liquid crystal display and displays information required to collect the operation information about the dump truck 20. The input device 17 is, for example, a keyboard, a touch panel, or a mouse and inputs information required to collect the operation information about the dump truck 20. The second wireless communication device 18 includes the antenna 18A and wirelessly communicates with the in-vehicle wireless communication device 27 of the dump truck 20 through the repeater 3 to exchange information. Next, the dump truck 20 will be described in detail.

<Dump Truck>

Figure 3:
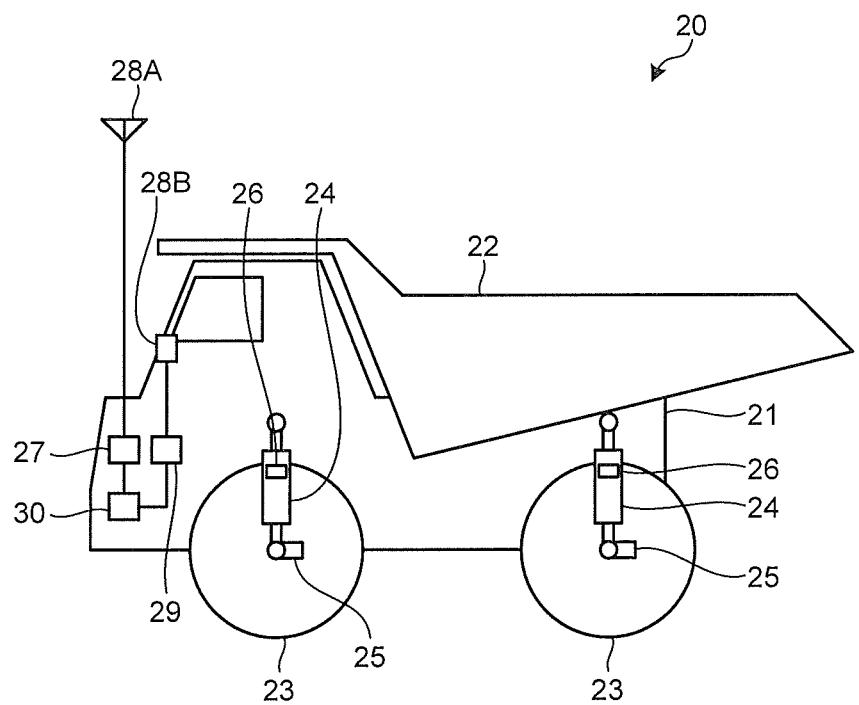
FIG. 3 is a diagram illustrating the structure of a dump truck.

FIG. 3 is a diagram illustrating the structure of a dump truck. The dump truck 20 loads freight, travels, and unloads the freight at a desired place. The dump truck 20 includes a vehicle body 21, a vessel 22, wheels 23, suspension cylinders 24, rotation sensors 25, suspension pressure sensors (pressure sensors) 26, the in-vehicle wireless communication device (first wireless communication device) 27 connected to the antenna 28A, a position information detecting device (a GPS receiver in this embodiment) 29 to which the GPS antenna 28B is connected, and an in-vehicle information collection device 30. The dump truck 20 includes various kinds of mechanisms and functions of the general truck, in addition to the above-mentioned components. In the first embodiment, the dump truck 20 is steered by front wheels (wheels 23). However, the invention can be applied to an articulated dump truck in which a vehicle body is divided into a front portion and a rear portion and the front and rear portions are connected to each other by an articulated joint.

In the dump truck 20, an internal-combustion engine, such as a diesel engine, drives a power generator to obtain power and an electric motor is driven by the power to drive the wheels 23 which are mechanically connected to an output shaft of an electric motor. As such, the dump truck 20 is a so-called electrically-driven type, but the driving type of the dump truck 20 is not limited thereto. The vessel 22 functions as a truck bed on which freight is loaded and is provided at the upper part of the vehicle body 21. For example, broken stones, or earth and sand are loaded as the freight on the vessel 22 by a loading machine such as an excavator. The wheel 23 includes a tire and a wheel frame, is provided in the vehicle body 21, and is driven by power transmitted from the vehicle body 21, as described above. The suspension cylinder 24 is provided between the wheel 23 and the vehicle body 21. In the vehicle body 21 and the vessel 22, a load corresponding to the weight of the freight when the freight is loaded is applied to the wheel 23 through the suspension cylinder 24.

The rotation sensor 25 detects the rotation speed of the wheel 23 to measure the vehicle speed. The suspension pressure sensor (referred to as a pressure sensor, if necessary) 26 detects the load applied to the suspension cylinder 24. That is, hydraulic oil is sealed in the suspension cylinder 24 and the suspension cylinder 24 is contracted and expanded according to the weight of the freight. The pressure sensor 26 is provided in each suspension cylinder 24 of the dump truck 20 and detects the pressure of the hydraulic oil to measure the weight of the freight (the amount of cargo). The GPS antenna 28B receives radio waves output from a plurality of GPS satellites 5A, 5B, and 5C (see FIG. 1) forming a GPS (Global Positioning System). The GPS antenna 28B outputs the received radio waves to the position information detecting device 29. The position information detecting device 29 converts the radio waves received by the GPS antenna into electric signals and calculates (measures) its position information, that is, the position information about the dump truck 20. The in-vehicle wireless communication device 27 wirelessly communicates with the repeater 3 or the antenna 18A of the management facility illustrated in FIG. 1 through the antenna 28A. The in-vehicle wireless communication device 27 is connected to the in-vehicle information collection device 30. In this way, the in-vehicle information collection device 30 transmits and receives each information item through the antenna 28A.

Next, the in-vehicle information collection device 30 and peripheral devices thereof will be described.

<In-Vehicle Information Collection Device and Peripheral Devices Thereof>

Figure 4:
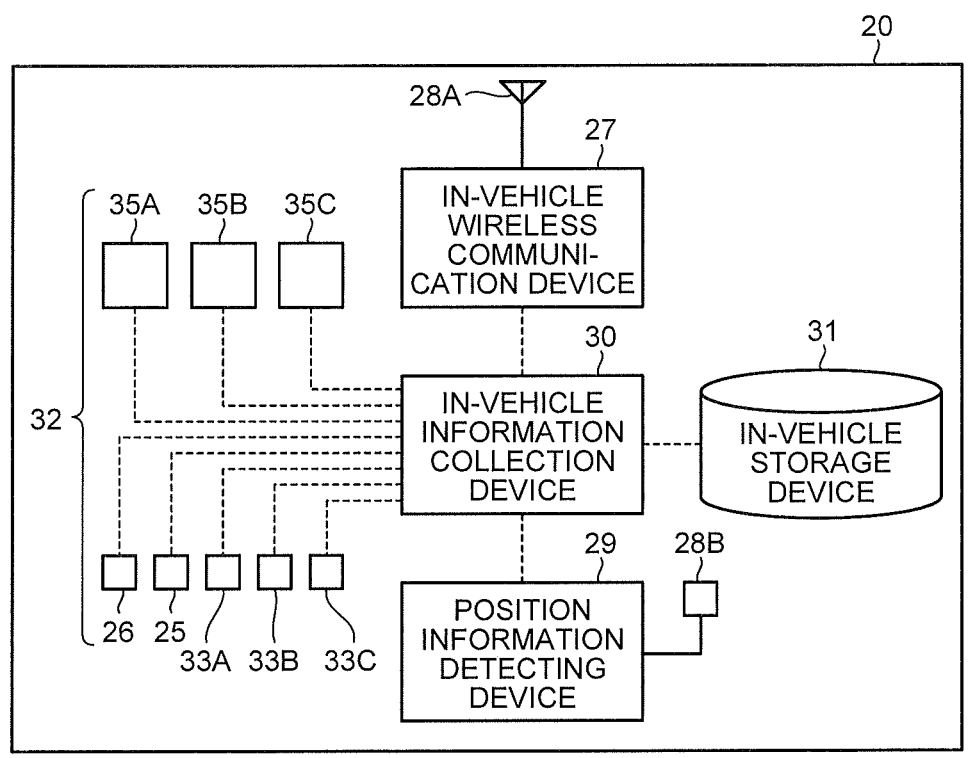
FIG. 4 is a functional block diagram illustrating an in-vehicle information collection device and peripheral devices thereof.

FIG. 4 is a functional block diagram illustrating the in-vehicle information collection device 30 and peripheral devices thereof. The in-vehicle information collection device 30 of the dump truck 20 is connected to an in-vehicle storage device 31, the in-vehicle wireless communication device 27, the position information detecting device 29, and a mining machine information acquiring device 32. The in-vehicle information collection device 30 is, for example, a computer including a CPU (Central Processing Unit) and a memory. The in-vehicle information collection device 30 collects operation information about the operation state of the dump truck 20 from the mining machine information acquiring device 32.

The in-vehicle storage device 31 is, for example, a RAM (Random Access Memory), a ROM (Read Only Memory), a flash memory, a hard disk drive, or combinations thereof. The in-vehicle storage device 31 stores a computer program in which commands for the in-vehicle information collection device 30 to collect operation information are described. The in-vehicle information collection device 30 reads the computer program, acquires the operation information from the mining machine information acquiring device 32 at a predetermined time, and temporarily stores the operation information in the in-vehicle storage device 31. When information, such as an engine temperature, is normally monitored, the predetermined time means a predetermined cycle. When an abnormal state (for example, an excessive increase in the temperature of hydraulic oil) occurs, the predetermined time means the time when the abnormal state occurs. In this case, the in-vehicle information collection device 30 may perform, for example, a statistical process of calculating the average, mode, or standard deviation of information in the same item.

The in-vehicle information collection device 30 receives a request from the information collection device 10 illustrated in FIG. 2 and transmits the collected operation information to the information collection device 10 through the in-vehicle wireless communication device 27. In addition, the in-vehicle information collection device 30 acquires the position information about the dump truck 20 from the position information detecting device 29 and transmits the acquired position information together with information about the vehicle speed and the traveling direction at the position in the position information to the information collection device 10 illustrated in FIG. 2 through the in-vehicle wireless communication device 27. The vehicle speed may be detected by the position information detecting device 29 or a vehicle speed sensor provided in the dump truck 20. The traveling direction may be calculated from, for example, a change in the position information at a predetermined time, or an acceleration sensor may be provided and the traveling direction may be the direction of acceleration detected by the acceleration sensor. Alternatively, the traveling direction may be calculated by a combination of the two methods.

The mining machine information acquiring device 32 includes various kinds of sensors, such as the rotation sensor 25, the pressure sensor 26, a hydraulic sensor 33A that detects a change in the pressure of hydraulic oil in a hoist cylinder which lifts and drops the vessel 22, a sensor 33B that detects an operation of a dump lever which is used by an operator to lift and drop the vessel 22, and a fuel sensor 33C. The mining machine information acquiring device 32 includes various kinds of control devices, such as an engine control device 35A that acquires information including signals output from various kinds of sensors or command signals generated by the operation of an accelerator by the driver and controls the engine of the dump truck 20, an electric motor control device 35B, and a hydraulic pressure control device 35C, in addition to the various kinds of sensors. The in-vehicle information collection device 30 collects information from the various kinds of sensors and the various kinds of control devices as the operation information for the dump truck 20. Next, in this embodiment, an example of a control (operation information collection control) operation in which the information collection system 1 of the mining machine collects the operation information about the dump truck 20 will be described.

<Operation Information Collection Control>

Figure 5:
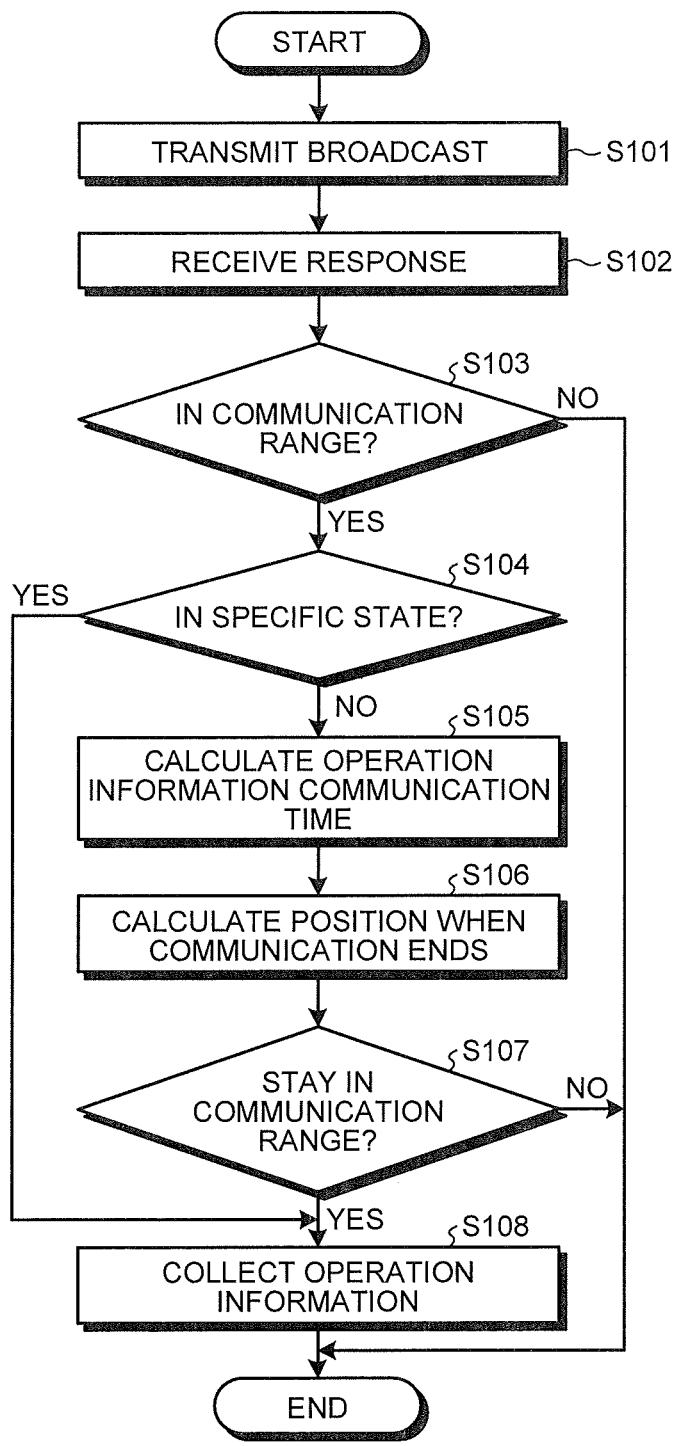
FIG. 5 is a flowchart illustrating an operation information collection control process according to the first embodiment.
Figure 7:
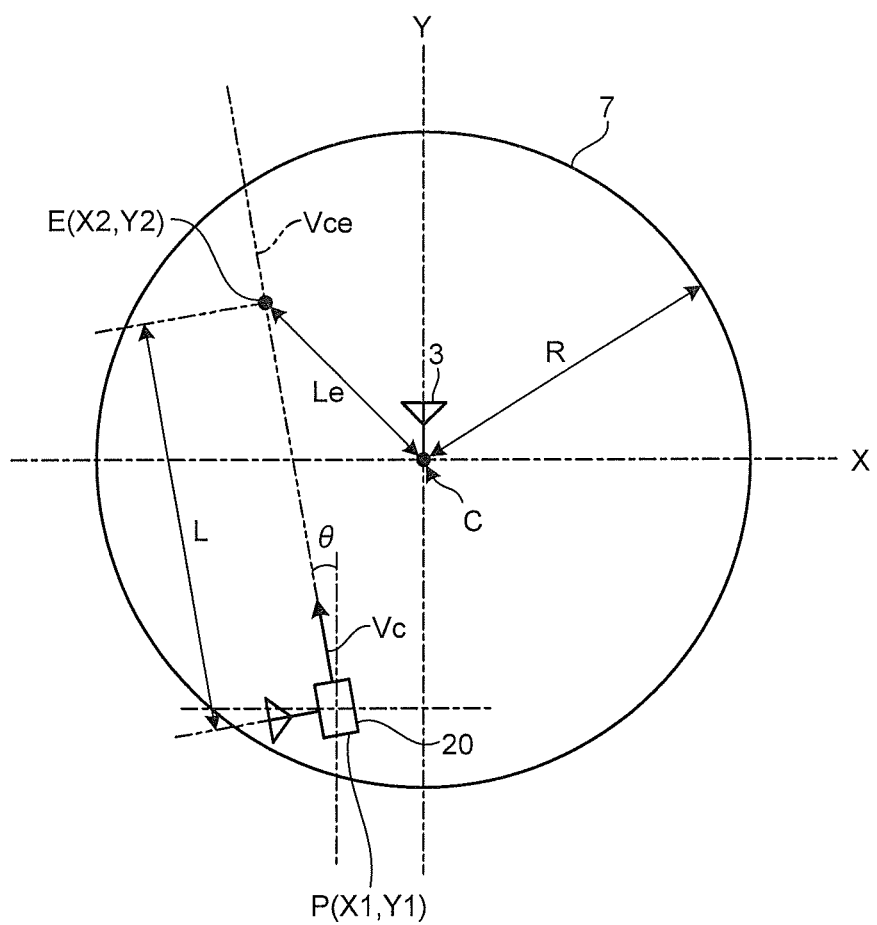
FIG. 7 is a diagram illustrating an example of a method of determining whether the dump truck can stay in a communication range until the communication of operation information ends.

FIG. 5 is a flowchart illustrating the procedure of an operation information collection control process according to the first embodiment. FIG. 6 is a table illustrating the correspondence between the state of the dump truck 20 and a method of determining the state. FIG. 7 is a diagram illustrating an example of a method of determining whether the dump truck 20 can stay in the communication range 7 until the communication of the operation information ends. In the operation information collection control according to this embodiment, the information collection device 10 provided in the mine management facility collects the operation information about the dump truck 20, which is a moving body, using wireless communication. The information collection device 10 in the management facility is scheduled to collect the operation information. The information collection device 10 instructs each dump truck 20 to transmit the operation information, for example, at a fixed time or a predetermined interval every day. In Step S101, the information collection device 10 transmits a broadcast. The broadcast is transmitted in a relatively short cycle (for example, once per second). All of the dump trucks 20 which operate in the mine do not receive the broadcast. When there are the dump trucks 20 which are disposed in the place where communication conditions are bad, some of the dump trucks 20 may not receive the broadcast.

The dump truck 20 which receives the broadcast using the in-vehicle wireless communication device 27 transmits a response to the information collection device 10. The dump truck 20 which does not receive the broadcast using the in-vehicle wireless communication device 27 does not transmit a response. In Step S102, the response transmitted from the in-vehicle wireless communication device 27 is received by the second wireless communication device 18 connected to the information collection device 10 through the repeater 3 and is then acquired by the information collection device 10. Then, the process proceeds to Step S103 and the information collection device 10 compares information about the position of the dump truck 20 included in the response with the position information which has been read from the storage device 13 and then stored in the communication range database 14. As a result, when the dump truck 20 (the dump truck 20 from which the response has been transmitted to the second wireless communication device 18) which has transmitted the response to the second wireless communication device 18 is in the communication range 7 (Step S103, Yes), the information collection device 10 proceeds to Step S104. When the dump truck 20 from which the response has been transmitted to the second wireless communication device 18 is not in the communication range 7 (Step S103, No), one cycle of the operation information collection control ends and the next cycle of the operation information collection control starts.

In Step S104, when information indicating that the dump truck 20 in the communication range 7 is in a specific state is received (Step S104, Yes), the information collection device 10 proceeds to Step S108. When the information indicating the specific state is not received (Step S104, No), the information collection device 10 proceeds to Step S105. The specific state means a state in which the dump truck 20 is stopped (halted) in the place where the wireless communication facility for receiving the operation information about the dump truck 20 is installed. The place where the wireless communication facility is installed means a place where the dump truck 20 is likely to be stopped for a given period of time. For example, the place includes a gas station for supplying fuel to the mining machine, such as the dump truck 20, an unloading place where the freight in the vessel 22 of the dump truck 20 is unloaded, or a loading place where broken stones are loaded to the vessel 22 of the dump truck 20 by, for example, an excavator. When the wireless communication facility (for example, the repeater 3) for collecting the operation information is installed in the place, data for the operation information can be transmitted to the management facility while fuel is being supplied, the freight is being loaded, or the freight is being unloaded. Therefore, it is possible to reliably transmit data.

When the dump truck 20 stays in the communication range 7 and is in the specific state (Yes in Step S103 and Yes in Step S104), in Step S108, the information collection device 10 acquires the operation information from the in-vehicle storage device 31 through the in-vehicle information collection device 30 of the dump truck 20 using wireless communication. In order to determine whether the dump truck 20 is in the specific state, the in-vehicle information collection device 30 of the dump truck 20 inserts, into the response to the broadcast, information indicating the state of the dump truck 20 when the response is transmitted and transmits the response. Examples of the information (dump state information) indicating the state of the dump truck 20 include information about the speed of the dump truck 20, information about the amount of freight in the vessel 22, and information about the amount of fuel. The information collection device 10 determines whether the dump truck 20 is in the specific state on the basis of the dump state information.

For example, when the speed of the dump truck 20 is 0 and the pressure of the pressure sensor 26 serving as a load measurement device is increasing, that is, it is detected that the amount of freight is increasing, it can be determined that the freight is being loaded to the dump truck 20 in the loading place since the freight is being loaded to the vessel 22 (see "loading" in FIG. 6). When the speed of the dump truck 20 is 0 and the pressure of the pressure sensor 26 is being reduced, that is, it is determined that the amount of freight is being reduced, it can be determined that the freight is being unloaded from the dump truck 20 in the loading place since the freight is being unloaded from the vessel 22 (see "unloading" in FIG. 6). When the speed of the dump truck 20 is 0, the fuel sensor 33C transmits a signal indicating an increase in fuel as a predetermined signal, the information about the position of the dump truck 20 included in the response to the broadcast is disposed in the known gas station in advance, it can be determined that the dump truck 20 is being supplied with oil in the gas station (see "oil supply" in FIG. 6). Since the repeater 3 corresponds to the wireless communication facility for collecting the operation information, the dump truck 20 stopped in the communication range 7 may be determined to be the specific state, that is, the dump truck 20 may be determined to be stopped in the place where the wireless communication facility for receiving the operation information is prepared. Therefore, even when the vehicle speed is 0 in the communication range 7 (see "stop" in FIG. 6), the dump truck 20 is in the specific state. As such, in this embodiment, it is determined whether the dump truck 20 is stopped in the place where the wireless communication facility is prepared, on the basis of at least one of a state of the speed of the dump truck 20 and a change in the amount of freight loaded in the dump truck 20. The in-vehicle information collection device 30 inserts the dump state information including the above-mentioned information into the response to the broadcast and transmits the response. The information collection device 10 determines the state of the dump truck 20 on the basis of the received dump state information.

When the dump truck 20 is not in the specific state (Step S104, No), in Step S105, the information collection device 10 calculates an operation information communication time. The operation information communication time is the time from the start of the communication of the operation information to be transmitted to the end of the communication. The operation information communication time can be calculated by dividing the amount of operation information to be transmitted by a communication rate (the operation information communication time=the standard amount of information/communication rate). The amount of operation information to be transmitted varies depending on the operation information collected by the in-vehicle information collection device 30. In this embodiment, a predetermined amount of information (the standard amount of information) is used. The communication rate is determined by the specifications of the in-vehicle wireless communication device 27, the second wireless communication device 18, and the repeater 3 (which holds for the following embodiments). The standard amount of information and the communication rate are stored in the storage device 13 of the information collection device 10. When the operation information communication time is calculated, the information collection device 10 reads the standard amount of information and the communication rate from the storage device 13 and calculates the operation information communication time. Since the standard amount of information and the communication rate have been known, the operation information communication time may be calculated in advance and then stored in the storage device 13 and the information collection device 10 may read the operation information communication time in Step S105.

Then, in Step S106, the information collection device 10 calculates the position (referred to as a position when communication ends) of the dump truck 20 when the communication of the operation information between the dump truck 20 and the information collection device 10, specifically, between the in-vehicle information collection device 30 and the information collection device 10 ends. The position when the communication ends is calculated on condition that the speed and the traveling direction of the dump truck 20 at present are maintained.

As illustrated in FIG. 7, it is assumed that the dump truck 20 in the communication range 7 travels at a speed Vc in a traveling direction Vce (an extension direction represented by an arrow indicating the speed Vc in FIG. 7). Information about the speed Vc and the traveling direction Vce of the dump truck 20 is included in the above-mentioned response. When the operation information communication time calculated in Step S105 is T, the operation information communication time T is required from the start to the end of communication. Since the dump truck 20 travels at the speed Vc, the distance L traveled by the dump truck 20 during the operation information communication time T is T×Vc. When the operation information starts to communicate at a position (communication start position) P(X1,Y1), it is expected that a position E(X2, Y2) which is T×Vc away from the position P(X1, Y1) in the traveling direction Vce will be a communication end position.

For example, it is assumed that, in the X-Y coordinate system having the position where the repeater 3 is provided as the origin, the traveling direction Vce of the dump truck 20 is inclined at an angle θ with respect to the Y-axis. The distance between the communication start position P(X1, Y1) and the communication end position E(X2, Y2) is L. Since the communication start position P(X1, Y1) is regarded to be the same as the position where the information collection device 10 receives the response, coordinate values are known. Therefore, the communication end position E(X2, Y2) can be represented by E(X1−L×sin θ, Y2+L×cos θ). As such, the communication end position E(X2, Y2) can be calculated on the basis of the information about the position of the dump truck 20, the vehicle speed (speed) and traveling direction of the dump truck 20, and the operation information communication time.

When the communication end position E(X2, Y2) is calculated, the process proceeds to Step S107 and the information collection device 10 determines whether the dump truck 20 can stay in the communication range 7 until the communication of the operation information to be transmitted ends. In this embodiment, as illustrated in FIG. 7, the communication range 7 is the inside of a circle with a radius R having the position of the repeater 3 as the center C(X0, Y0). Therefore, when the communication end position E(X2, Y2) calculated in Step S106 is in the communication range 7, the dump truck 20 can stay in the communication range 7 until the communication of the operation information ends.

For example, when a distance Le between the center C(X0, Y0) and the communication end position E(X2, Y2) is less than R, the communication end position E(X2, Y2) is in the communication range 7. For example, the information collection device 10 calculates the distance Le and compares the distance Le with R. When R>Le is satisfied, it is determined that the dump truck 20 can stay in the communication range 7 until the communication of the operation information ends (Step S107, Yes). In this case, in Step S108, the information collection device 10 acquires the operation information from the in-vehicle storage device 31 through the in-vehicle information collection device 30 of the dump truck 20 using wireless communication. When R≤Le is satisfied, the information collection device 10 determines that the dump truck 20 may not stay in the communication range 7 until the communication of the operation information ends (Step S107, No). In this case, one cycle of the operation information collection control ends and the next cycle of the operation information collection control starts.

In this embodiment, when the operation information about the dump truck 20, which is a moving body, is collected, the operation information is collected from the dump truck 20 which can stay in the communication range 7 until the response to the broadcast is received and the communication of the operation information to be transmitted ends. In order to perform the process, information in the response to the broadcast includes the vehicle speed (speed) and the traveling direction, in addition to the position information. Then, the information collection device 10 determines whether the dump truck 20 whose response to the broadcast is received can stay in the communication range 7 until the communication of the operation information about the dump truck 20 which will be transmitted ends, on the basis of the acquired position information, vehicle speed, and traveling direction, the operation information communication time, and the position information about the communication range 7. In this way, the dump truck 20 is selected which can stay in the communication range 7 until the communication of the operation information ends. Therefore, it is possible to achieve stable and reliable wireless communication and reliably and effectively collect the operation information about the dump truck 20. That is, when the operation information about the dump truck 20 is collected by wireless communication, the information collection device 10 can prevent the communication of information from being interrupted and reliably collect the operation information.

In this embodiment, when the dump truck 20 is stopped in the communication range 7 and the place where the wireless communication facility for receiving the operation information is prepared, the information collection device 10 does not perform "the process of determining whether the dump truck 20 can stay in the communication range 7 until the communication of the operation information ends". Then, the information collection device 10 collects the operation information about the dump truck 20 which is stopped in the place where the wireless communication facility is prepared. In this way, when the dump truck 20 is in the specific state in the communication range 7, it is not necessary to determine whether the dump truck 20 can stay in the communication range 7 until the communication of the operation information to be transmitted ends. Therefore, it is possible to rapidly perform the process. In addition, in this embodiment, the process of determining whether the dump truck 20 is in the specific state, that is, Step S104 may not be performed (which holds for the following embodiments). In this case, when the determination result in Step S103 is "Yes", Step S105 is performed.

In this embodiment, the information collection device 10 determines whether the dump truck 20 whose response to the broadcast is received can stay in the communication range 7 until the communication of the operation information about the dump truck 20 ends. Therefore, the in-vehicle information collection device 10 of the dump truck 20 only transmits the response to the broadcast. For example, even when the position of the repeater 3 is changed and the communication range 7 is changed, the information collection device 10 may only rewrite the communication range database 14. As a result, in this embodiment, even when the layout of the mine is changed and the position of the repeater 3 is changed and even when the structure of the information collection system 1 is changed, it is possible to relatively easily respond to the changes. When each dump truck 20 performs the process from Step S103 to Step S107, it is possible to respond to the process by transmitting information in the communication range database 14 rewritten by the information collection device 10 from the management facility to each dump truck 20.

Second Embodiment

A second embodiment can be implemented by the same system structure as the information collection system 1 according to the first embodiment. In the first embodiment, the information collection device 10 provided in the mine management facility transmits the broadcast and determines whether the dump truck can stay in the communication range 7 until the communication of the operation information ends. In this embodiment, the in-vehicle information collection device 30 illustrated in FIG. 4 determines whether the dump truck 20 including the in-vehicle information collection device 30 stays in the communication range 7, determines whether the dump truck 20 can stay in the communication range 7 until the communication of operation information ends, and transmits the operation information to the information collection device 10.

Therefore, the in-vehicle information collection device 30 includes the functions of the information collection device 10 according to the first embodiment, except for the transmission of the broadcast. When the dump truck can stay in the communication range 7 of the in-vehicle wireless communication device 27 until the communication of the operation information to be transmitted ends, the in-vehicle information collection device 30 transmits the operation information to the information collection device 10 through the in-vehicle wireless communication device 27. Then, the in-vehicle information collection device 30 determines whether the dump truck 20 can stay in the communication range 7 until the communication of the operation information to be transmitted ends, on the basis of information about position, the speed and traveling direction of the dump truck 20 including the in-vehicle information collection device 30, the operation information communication time, and position information about the communication range 7. Next, an example of operation information collection control according to this embodiment will be described.

<Operation Information Collection Control>

Figure 8:
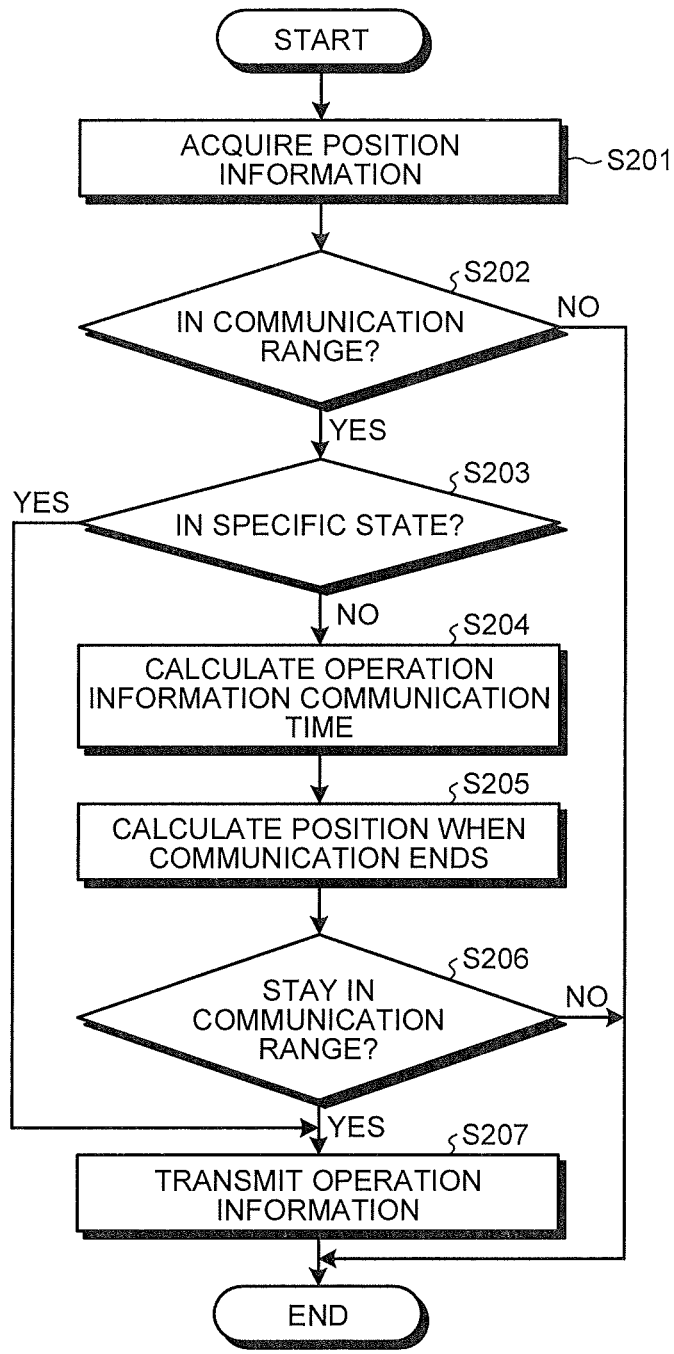
FIG. 8 is a flowchart illustrating an operation information collection control process according to a second embodiment.

FIG. 8 is a flowchart illustrating the procedure of an operation information collection control process according to the second embodiment. In this embodiment, the dump truck 20, that is, the in-vehicle information collection device 30 determines the time when the operation information is transmitted to the information collection device 10 and transmits the operation information. In this embodiment, the in-vehicle information collection device 30 mainly performs each step of the operation information collection control process, and the content of each step of the operation information collection control process is substantially the same as that of the corresponding steps of the operation information collection control process according to the first embodiment. Since the in-vehicle information collection device 30 performs the process, the in-vehicle storage device 31 stores the above-mentioned communication range database 14 as information about the communication range 7 required for the process.

In Step S201, the in-vehicle information collection device 30 acquires the position information about the dump truck 20 including the in-vehicle information collection device 30 using a position information detecting device 29. In this embodiment, the position information is the latitude and longitude (the altitude, if necessary) acquired from the position information detecting device 29 illustrated in FIG. 4. Then, the process proceeds to Step S202 and the in-vehicle information collection device 30 compares the position information about the dump truck 20 obtained in Step S201 with the position information which has been read from the in-vehicle storage device 31 and then stored in the communication range database 14. When the dump truck 20 stays in the communication range 7 (Step S202, Yes), the information collection device 10 proceeds to Step S203. When the dump truck 20 does not stay in the communication range 7 (Step S202, No), one cycle of the operation information collection control ends and the next cycle of the operation information collection control starts.

The content of the process in Step S203 is the same as that of the process in Step S104 in the first embodiment and the in-vehicle information collection device 30 performs the process. When the dump truck 20 stays in the communication range 7 and is in a specific state (Yes in Step S202 and Yes in Step S203), in Step S207, the in-vehicle information collection device 30 transmits the operation information to be transmitted from the in-vehicle storage device 31 to the information collection device 10 using wireless communication. The in-vehicle information collection device 30 determines whether the dump truck 20 is in the specific state on the basis of information indicating the state of the dump truck 20.

When the dump truck 20 is not in the specific state (Step S203, No), in Step S204, the in-vehicle information collection device 30 calculates the operation information communication time. In this embodiment, the operation information communication time can be calculated by dividing the actual amount of operation information transmitted by the in-vehicle information collection device 30 by the communication rate (the operation information communication time=the actual amount of information/the communication rate). In this way, even when the amount of operation information to be transmitted is changed, it is possible to accurately calculate the operation information communication time. Then, the in-vehicle information collection device 30 proceeds to Step S205 and calculates a communication end position. A position when communication ends and a method of calculating the position are the same as those in the first embodiment.

When the communication end position is calculated, the in-vehicle information collection device 30 proceeds to Step S206 and determines whether the dump truck 20 can stay in the communication range 7 until the communication of the operation information to be transmitted ends. The determination method is the same as that in the first embodiment. When the in-vehicle information collection device 30 determines that the dump truck 20 can stay in the communication range 7 until the communication of the operation information to be transmitted ends (R>Le, as illustrated in FIG. 7) (Step S206, Yes), in Step S207, the in-vehicle information collection device 30 transmits the operation information from the in-vehicle storage device 31 to the information collection device 10 using wireless communication. On the other hand, when R Le is satisfied as illustrated in FIG. 7, the in-vehicle information collection device 30 determines that the dump truck 20 may not stay in the communication range 7 until the communication of the operation information to be transmitted ends (Step S206, No). In this case, one cycle of the operation information collection control ends and the next cycle of the operation information collection control starts.

In this embodiment, when the operation information about the dump truck 20, which is a moving body, is collected, the dump truck 20 which can stay in the communication range 7 until the communication of the operation information ends transmits the operation information to the information collection device 10. In this way, it is possible to achieve stable and reliable wireless communication and reliably and effectively collect the operation information about the dump truck 20. In addition, in this embodiment, since the information collection device 10 does not need to transmit a broadcast, it is possible to reduce the load of a wireless communication line and thus reduce the load of the information collection device 10.

Third Embodiment

In a third embodiment, similarly to the second embodiment, the in-vehicle information collection device 30 illustrated in FIG. 4 determines whether the dump truck 20 including the in-vehicle information collection device 30 stays in the communication range 7, determines whether the dump truck 20 can stay in the communication range 7 until the communication of operation information to be transmitted ends, and transmits the operation information to the information collection device 10. In addition, in the third embodiment, the moving path of the dump truck 20 when the operation information is transmitted is stored as an operation information transmittable path in the in-vehicle storage device 31 so as to be associated with the time when the dump truck 20 can stay in the communication range 7. Then, when the dump truck 20 including the in-vehicle information collection device 30 enters the communication range 7 while moving along the operation information transmittable path, the in-vehicle information collection device 30 determines whether the dump truck 20 can stay in the communication range 7 until the communication of the operation information to be transmitted ends, on the basis of the time when the dump truck 20 can stay in the communication range and the operation information communication time. In this way, when the dump truck 20 passes through the operation information transmittable path, the time when the dump truck 20 can stay in the communication range 7 is known from the previous history and is used to reduce the processing time. Next, an example of operation information collection control according to this embodiment will be described.

Figure 9:
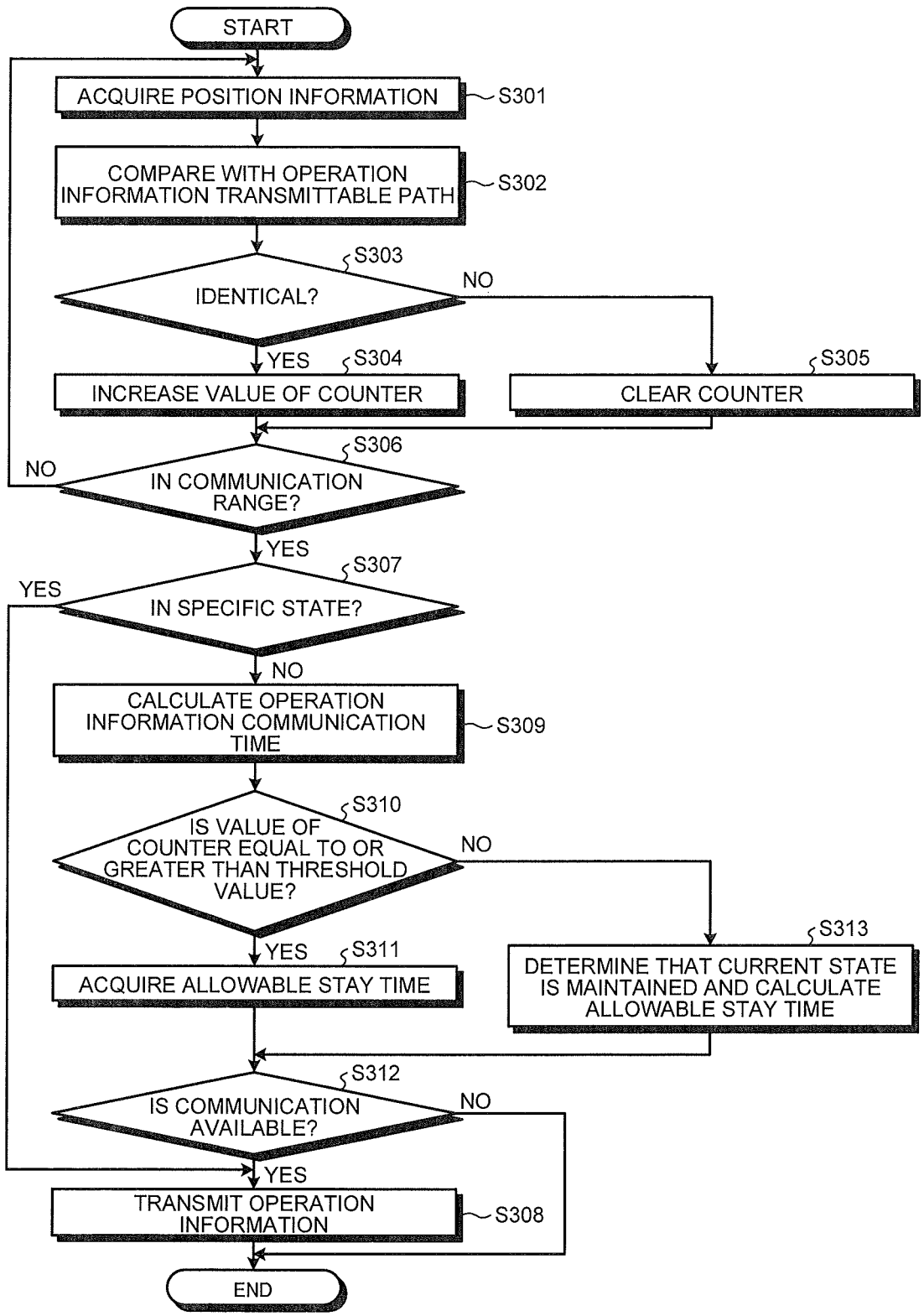
FIG. 9 is a flowchart illustrating the procedure of a process related to the collection of operation information according to a third embodiment.
Figure 11:
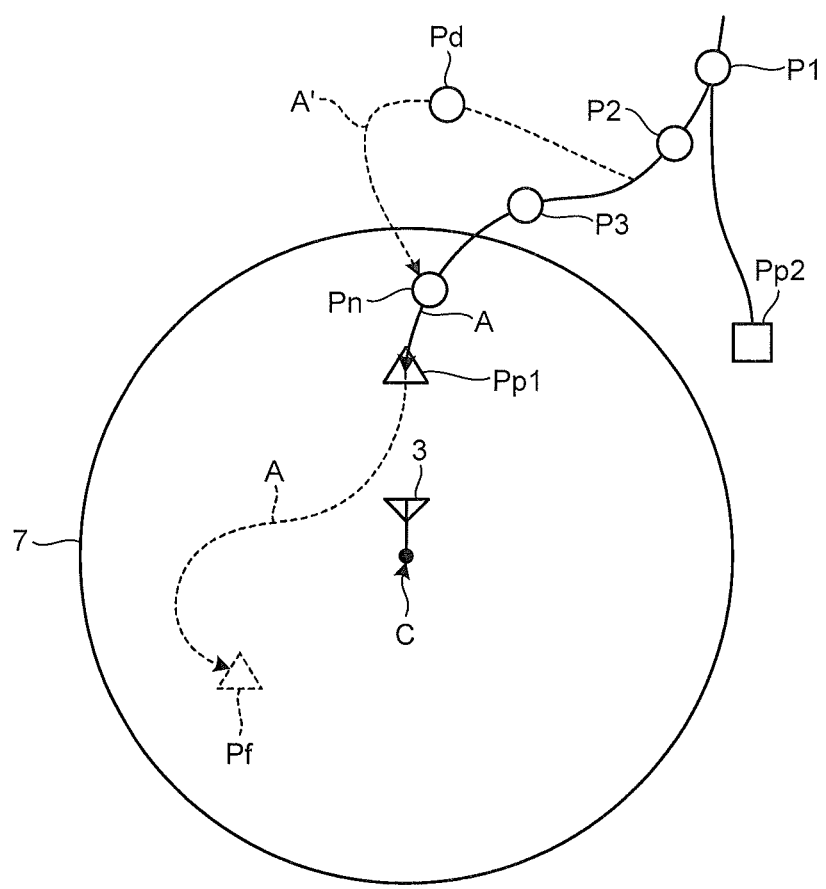
FIG. 11 is a diagram illustrating the moving path of the dump truck and the communication range.
Figure 12:
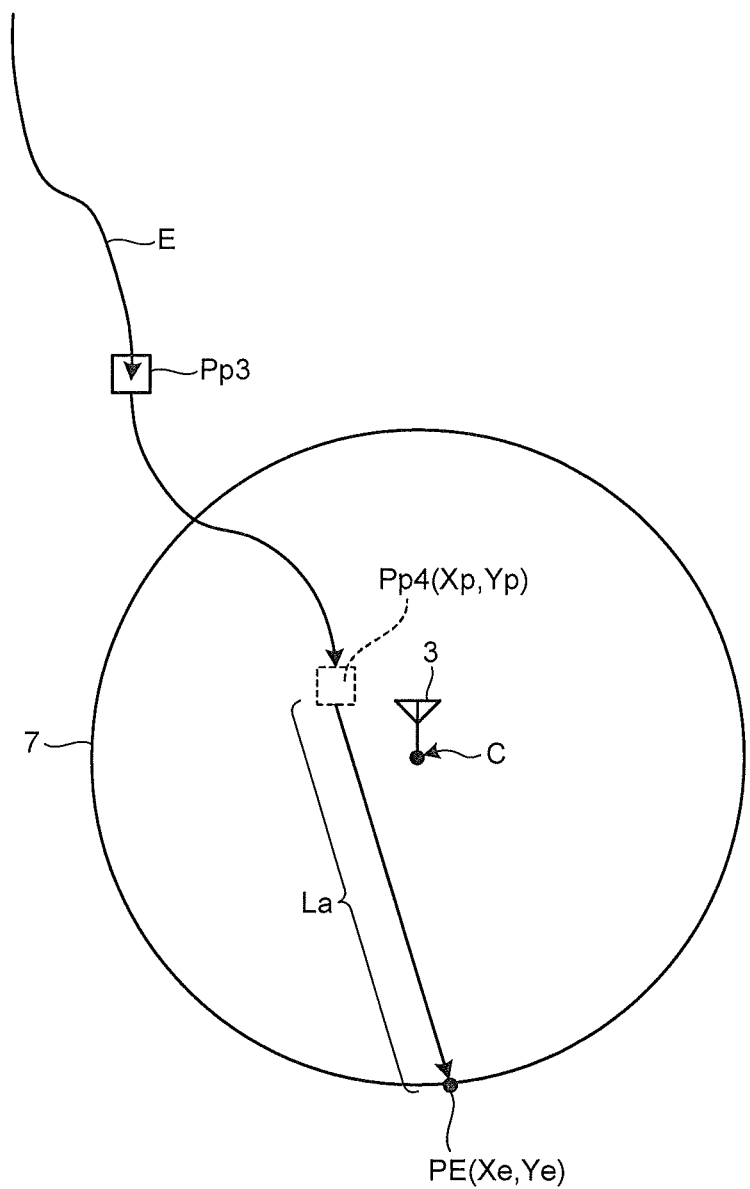
FIG. 12 is a diagram illustrating the moving path of the dump truck and the communication range.

FIG. 9 is a flowchart illustrating the procedure of a process related to the collection of operation information according to third embodiment. FIG. 10 is a diagram illustrating an example of a data table 36 in which moving path information indicating the history of the moving path is associated with the time when the dump truck can stay in the communication range 7 which corresponds to the history of the moving path. FIGS. 11 and 12 are diagrams illustrating the moving path of the dump truck and the communication range 7.

In Step S301, the in-vehicle information collection device 30 acquires at least position information about the dump truck 20 including the in-vehicle information collection device 30. Step S301 is the same as Step S202 in the second embodiment. Then, in Step S302, the in-vehicle information collection device 30 compares the position information about the dump truck 20 which is acquired in Step S301 with the operation information transmittable path. The operation information transmittable path is information indicating the previous moving path and is particularly a moving path of the dump truck 20 associated with the allowable stay time of the dump truck when the dump truck 20 travels in the communication range 7. Next, the data table 36 will be described.

The data table 36 illustrated in FIG. 10 is used to determine whether the dump truck 20 is moved along the operation information transmittable path in the operation information collection control according to this embodiment. The data table 36 is stored in the in-vehicle storage device 31. The moving path information and the time when the allowable stay time (the time when the dump truck 20 can stay in the communication range 7) are described in the data table 36 so as to be associated with each other. Case numbers are given for convenience of explanation and are not given in the actual data table 36.

The moving path information is a set of position information (latitude and longitude) indicating the traveling path along which the dump truck 20 travels.

In the data table 36, A, B, and C indicate the kinds of moving paths. 1 to f indicate time points when the moving path information is acquired at a predetermined time interval. X and Y indicate coordinate values in the X-Y coordinate system. In addition, X corresponds to the latitude and Y corresponds to the longitude. For example, A(X, Y)1 indicates a first position information item which is acquired in a moving path A. As in case 2, when the dump truck 20 travels only to 2, the previous moving path information is only B(X, Y)1 and B(X, Y)2 and the position information is not accumulated. When the dump truck 20 has never entered the communication range 7, there is no information about the allowable stay time, as in case 2 and case 5.

Each case will be described in detail with reference to FIGS. 10 and 11.

(1) Case 1 is when the dump truck travels to a point Pf along the traveling path A and stays in the communication range for a time TAf.

(2) Case 2 is position information about a traveling path when the dump truck travels to a point P2 along a traveling path B. In case 2, the dump truck does not say in the communication range.

(3) Case 3 is when the dump truck travels to a point P2 along a traveling path C and stays in the communication range for a time TC1.

(4) Case 4 is when the dump truck travels to the point Pf along the traveling path A and does not stay in the communication range.

(5) Case 5 is position information about a traveling path when the dump truck travels to the point P2 along the traveling path A. In case 5, the dump truck does not say in the communication range.

(6) Case 6 is when the dump truck travels to a point Pn along the traveling path A and stays in the communication range for a time TAn.

Case 1 and case 6 are different from each other in that the dump truck 20 travels to the points Pn and Pf in FIG. 11. The allowable stay time satisfies the following relationship: TAn<TAf. Case 4 and case 5 are different from each other in that the dump truck 20 travels to the points Pf and P2. In case 5, when the dump truck 20 travels to the point Pf, the moving path information is the same as that in case 4.

In this embodiment, the in-vehicle information collection device 30 of the dump truck 20 stores the moving path information, that is, the history of the previous moving path in the in-vehicle storage device 31 at a predetermined time interval. Then, the in-vehicle information collection device 30 describes the moving path information and the allowable stay time in the data table 36.

The in-vehicle information collection device 30 compares the position information about the dump truck 20 with position information about the operation information transmittable path. When the position information items are identical to each other (Step S303, Yes), the process proceeds to Step S304. When the position information items are not identical to each other (Step S303, No), the process proceeds to Step S305. The determination of whether the position information items are identical to each other includes complete identity between the two position information items and identity between the two position information items in a predetermined range.

Points P1, P2, P3, Pp1, and Pf on a solid line represented by A and a dashed line in FIG. 11 correspond to the position information of the operation information transmittable path A. When the dump truck 20 travels through the points P1, P2, and P3 and reaches the point Pp1, the position information about the dump truck 20 is identical to the position information about the operation information transmittable path A. This is because the previous moving path information is identical to the moving path of the dump truck 20. On the other hand, when the dump truck 20 travels to the point P1 and then reaches the point Pp2, the position information about the dump truck 20 is not identical to the position information about the operation information transmittable path A. This is because there is no previous moving path information and there is no history of the previous moving path.

When the position information about the dump truck 20 is identical to the position information about the operation information transmittable path, a counter increases (count value Nc=1) in Step S304. When the position information about the dump truck 20 is not identical to the position information about the operation information transmittable path, the counter is cleared (count value Nc=0) in Step S305. Then, the process proceeds to Step S306 and the in-vehicle information collection device 30 determines whether the dump truck 20 enters the communication range 7. This determination is the same as that in Step S202 in the second embodiment.

When the dump truck 20 enters the communication range 7 (Step S306, Yes), the process proceeds to Step S307. The content of the process in Step S307 is the same as that of the process in Step S104 in the first embodiment and the in-vehicle information collection device 30 performs the process.

When the dump truck 20 stays in the communication range 7 and is in a specific state (Yes in Step S306 and Yes in Step S307), in Step S308, the in-vehicle information collection device 30 transmits the operation information from the in-vehicle storage device 31 to the information collection device 10 using wireless communication.

When the dump truck 20 does not enter the communication range 7 (Step S306, No), the in-vehicle information collection device 30 returns to Step S301 and repeatedly performs Steps S301 to S305 until the dump truck 20 enters the communication range 7 (Step S306, Yes). As such, in this embodiment, Steps S301 to S305 are repeatedly performed at a predetermined time interval until the dump truck 20 enters the communication range 7. When the dump truck 20 travels along the same moving path as the operation information transmittable path, the position information about the dump truck 20 is identical to the position information about the operation information transmittable path in Step S303. Therefore, whenever the dump truck 20 travels along the same operation information transmittable path, the counter increases in Step S304 and the count value Nc increases.

For example, in the operation information transmittable path A illustrated in FIG. 11, when the dump truck 20 travels through the points P1, P2, and P3, the position information about the dump truck 20 is identical to the position information about the operation information transmittable path A three times. In this case, since the counter increases at the points P1, P2, and P3, the count value Nc is 3 at the time when the dump truck 20 passes through the point P3.

When the dump truck 20 does not travel along the same operation information transmittable path, the position information about the dump truck 20 is not identical to the position information about the operation information transmittable path in Step S303. For example, in the operation information transmittable path A illustrated in FIG. 11, when the dump truck 20 travels through the points P1 and P2, the position information about the dump truck 20 is identical to the position information about the operation information transmittable path A two times. Therefore, the count value Nc is 2. Then, when the dump truck 20 travels to a point Pd through a moving path A' represented by a dotted line in FIG. 11, position information Pd about the dump truck 20 is not identical to the position information about the operation information transmittable path A. In this case, since the counter is reset in Step S305, the count value Nc is 0. In this case, when the moving path of the dump truck 20 returns to the operation information transmittable path A at a point Pn, the count value Nc is 1, which is less than the count value Nc when the dump truck 20 does not deviate from the operation information transmittable path A.

During the traveling of the dump truck 20, whenever the position information about the dump truck 20 is identical to the operation information transmittable path, the count value Nc increases. As the count value Nc increases, the degree of identity between the moving path of the dump truck 20 and the operation information transmittable path increases. The dump truck 20 reliably travels along the operation information transmittable path. That is, the count value Nc is an index indicating the traveling of the dump truck 20 along the operation information transmittable path. Next, a case in which the determination result in Step S307 is "No" will be described.

When the dump truck 20 is not in the specific state (No in Step S307), the process proceeds to Step S309. In Step S309, the in-vehicle information collection device 30 calculates an operation information communication time. The operation information communication time and a method of calculating the operation information communication time are the same as those in Step S204 in the second embodiment. Then, the process proceeds to Step S310. When the value of the counter, that is, the count value Nc is equal to or greater than a predetermined threshold value (Step S310, Yes), the in-vehicle information collection device 30 proceeds to Step S311. That is, when the count value Nc is equal to or greater than the predetermined threshold value, the dump truck 20 is traveling along the operation information transmittable path and the in-vehicle information collection device 30 determines whether the dump truck 20 can stay in the communication range 7 until the communication of the operation information to be transmitted ends, on the basis of the allowable stay time which corresponds to the operation information transmittable path and is stored in the data table 36.

In Step S311, the in-vehicle information collection device 30 reads, from the data table 36 of the in-vehicle storage device 31, the allowable stay time TAf corresponding to the operation information transmittable path (the operation information transmittable path A in the example illustrated in FIG. 11) along which the dump truck 20 is traveling. Then, in Step S312, the in-vehicle information collection device 30 compares the operation information communication time calculated in Step S309 with the allowable stay time TAf. When the former is less than the latter, it is determined that the operation information can be transmitted to the information collection device 10 (Step S312, Yes) and the process proceeds to Step S308. Then, in Step S308, the in-vehicle information collection device 30 transmits the operation information from the in-vehicle storage device 31 to the information collection device 10 using wireless communication. When the operation information communication time is equal to or more than the allowable stay time TAf, it is determined that the operation information may not be transmitted to the information collection device 10 (Step S312, No). One cycle of the operation information collection control ends and the next cycle of the operation information collection control starts. Next, the process returns to Step S310 and will be described.

In Step S310, when the value of the counter, that is, the count value Nc is less than the predetermined threshold value (Step S310, No), the in-vehicle information collection device 30 proceeds to Step S313. In Step S313, the in-vehicle information collection device 30 determines that the current state of the dump truck 20 is maintained and calculates the time when the dump truck 20 can stay in the communication range 7. When the count value Nc is less than the predetermined threshold value, it is considered that the non-identity between the moving path of the dump truck 20 and the operation information transmittable path increases. For example, in the example illustrated in FIG. 12, a moving path E is not described in the data table 36. When the dump truck 20 travels on the moving path E, passes through a point Pp3 on the moving path E, and enters the communication range 7, it is determined that the dump truck 20 enters the communication range 7 along a moving path which is not identical to the operation information transmittable path and Step S313 is performed.

When the dump truck 20 reaches a point Pp4 and Step S313 is performed, a distance La is calculated from the speed of the dump truck 20 at the point Pp4, position information (Xp,Yp) about the point Pp4, the traveling direction at the point Pp4, and the communication range 7. The distance La is from the point Pp4 to a position PE(Xe, Ye) which intersects the outer circumference of the communication range 7 when the dump truck 20 travels in the traveling direction of the point Pp4 at a speed Vs at the point Pp4. The position PE(Xe, Ye) can be calculated from the traveling direction of the dump truck 20 at the point Pp4 and position information (Xp, Yp) about the point Pp4. Therefore, the distance La can be calculated by $\sqrt{\{(Xe-Xp)^2+(Ye-Yp)^2\}}$.

The distance La is divided by the speed of the dump truck 20 at the point Pp4 to calculate the time Tp when the dump truck 20 can stay in the communication range 7. The time Tp is compared with the operation information communication time calculated in Step S309. When the time Tp is more than the operation information communication time, it is determined that the operation information can be transmitted to the information collection device 10 (Step S312, Yes) and the process proceeds to Step S308. In Step S308, the in-vehicle information collection device 30 transmits the operation information from the in-vehicle storage device 31 to the information collection device 10 using wireless communication. When the time Tp is equal to or less than the operation information communication time, it is determined that the operation information may not be transmitted to the information collection device 10 (Step S312, No). One cycle of the operation information collection control ends and the next cycle of the operation information collection control starts.

In the above-mentioned example, it is determined whether the moving path of the dump truck 20 is identical to the operation information transmittable path on the basis of the position information about the dump truck 20. However, it may be determined whether the two paths are identical to each other on the basis of at least one of the speed and the traveling direction of the dump truck 20 which is traveling. In this case, in the data table 36, at least one of the history of the speed of the dump truck 20 and the history of the traveling direction of the dump truck 20 is described in the moving path information so as to be associated with the position information.

In this embodiment, in addition to the process according to the second embodiment, the previous moving path of the dump truck 20 is used as the operation information transmittable path and is associated with the time when the dump truck can stay in the communication range. During the collection of the operation information about the dump truck 20, which is a moving body, when the dump truck passes through the operation information transmittable path, the time when the dump truck can stay in the communication range 7, which is obtained from the previous result, can be used. Therefore, it is possible to predict the communication time required for the amount of operation information to be transmitted and it is not necessary to calculate the time when the dump truck 20 can stay in the communication range 7. As a result, in this embodiment, similarly to the second embodiment, it is possible to achieve stable and reliable wireless communication and reliably and effectively collect the operation information about the dump truck 20. In addition, it is possible to reduce the processing time required to collect the operation information.

In particularly, the dump truck 20 which operates in the mine is less likely to travel along different moving paths and is more likely to travel along the same moving path in the loading place and the unloading place for a predetermined period. Therefore, the dump truck 20 is likely to travel along the operation information transmittable path. As a result, this embodiment is useful for a mining machine.

REFERENCE SIGNS LIST 1 information collection system of mining machine (information collection system)
3 repeater
5A, 5B, 5C GPS satellite
7 communication range
10 information collection device
12 processing device
13 storage device
14 communication range database
15 input/output unit
16 display device
17 input device
18 second wireless communication device
18A antenna
20, 20a, 20b, 20c dump truck
21 vehicle body
22 vessel
23 wheel
24 suspension cylinder
25 rotation sensor
26 pressure sensor
27 in-vehicle wireless communication device (first wireless communication device)
28A antenna
28B GPS antenna
29 position information detecting device
30 in-vehicle information collection device
31 in-vehicle storage device
32 mining machine information acquiring device
36 data table

The invention claimed is:

1. A mining machine information collection system comprising:
an in-vehicle information collection device that is provided in a mining machine and collects operation information about an operation state of the mining machine;
a position information detecting device that is provided in the mining machine and detects position information about a position of the mining machine;
a first wireless communication device that is provided in the mining machine and performs communication; and
an information collection device that collects the operation information through a second wireless communication device which communicates with the first wireless communication device,
wherein the information collection device transmits a position information request command to request a transmission of the position information of the mining machine through the second wireless communication device at a predetermined time, and
the information collection device determines whether the mining machine whose response to the position information request command is received by the second wireless communication device in a communication range of the first wireless communication device until a communication of the operation information of the mining machine ends, and when the information collection device determines the mining machine whose response to the position information request command is received by the second wireless communication device is in the communication range of the first wireless communication device until the communication of the operation information of the mining machine ends, the information collection device collects the operation information of the mining machine whose response is received, and the information collection device determines whether the mining machine whose response is received can stay in the communication range until the communication of the operation information of the mining machine ends, based on the position information, a speed and a traveling direction of the mining machine whose response is received of the mining machine, communication time of the operation information, and position information about the communication range.

2. The mining machine information collection system according to claim 1, wherein, when receiving information indicating that the mining machine is stopped in the communication range and a place where a wireless communication facility for receiving the operation information is prepared from the in-vehicle information collection device, the information collection device does not perform the determination and collects the operation information of the mining machine stopped in the place where the wireless communication facility is prepared.

3. A mining machine information collection system comprising:

an in-vehicle wireless communication device that is provided in a mining machine and performs communication;

an in-vehicle storage device that stores a communication range of the in-vehicle wireless communication device;

a position information detecting device that is provided in the mining machine and detects position information about a position of the mining machine;

an in-vehicle information collection device that is provided in the mining machine and collects operation information about an operation state of the mining machine; and an information collection device that collects the operation information, wherein the in-vehicle information collection device determines whether the mining machine is in a communication range of the in-vehicle wireless communication device until a communication of the operation information ends, and when the in-vehicle information collection device determines the mining machine is in the communication range of the in-vehicle wireless communication device until the communication of the operation information ends, the in-vehicle information collection device transmits the operation information to the information collection device through the in-vehicle wireless communication device, and the in-vehicle information collection device determines whether the mining machine can stay in the communication range until the communication of the operation information ends, based on the position information, a speed and a traveling direction of the mining machine, communication time of the operation information, and position information about the communication range.

4. A mining machine information collection system comprising:

an in-vehicle wireless communication device that is provided in a mining machine and performs communication;

an in-vehicle storage device that stores a communication range of the in-vehicle wireless communication device;

a position information detecting device that is provided in the mining machine and detects position information about a position of the mining machine;

an in-vehicle information collection device that is provided in the mining machine and collects operation information about an operation state of the mining machine; and an information collection device that collects the operation information, wherein the in-vehicle information collection device determines whether the mining machine is in a communication range of the in-vehicle wireless communication device until a communication of the operation information ends, and when the in-vehicle information collection device determines the mining machine is in the communication range of the in-vehicle wireless communication device until the communication of the operation information ends, the in-vehicle information collection device transmits the operation information to the information collection device through the in-vehicle wireless communication device, and wherein the in-vehicle storage device stores a moving path of the mining machine when the operation information is transmitted as an operation information transmittable path in association with a time when the mining machine can stay in the communication range, and when the mining machine enters the communication range while moving along the operation information transmittable path, the in-vehicle information collection device determines whether the mining machine can stay in the communication range until the communication of the operation information ends, based on the time when the mining machine can stay and communication time of the operation information.

5. The mining machine information collection system according to claim 3, wherein, when the mining machine is stopped in the communication range and a place where a wireless communication facility for receiving the operation information is prepared, the in-vehicle information collection device transmits the operation information without performing the determination.

6. The mining machine information collection system according to claim 5, wherein it is determined whether the mining machine is stopped in the place where the wireless communication facility is prepared based on at least one of a state of the speed of the mining machine and a change in an amount of freight loaded in the mining machine.

7. The mining machine information collection system according to claim 2, wherein it is determined whether the mining machine is stopped in the place where the wireless communication facility is prepared based on at least one of a state of the speed of the mining machine and a change in an amount of freight loaded in the mining machine.

8. The mining machine information collection system according to claim 4, wherein, when the mining machine is stopped in the communication range and a place where a wireless communication facility for receiving the operation information is prepared, the in-vehicle information collection device transmits the operation information without performing the determination.

9. The mining machine information collection system according to claim 8, wherein it is determined whether the mining machine is stopped in the place where the wireless communication facility is prepared based on at least one of a state of the speed of the mining machine and a change in an amount of freight loaded in the mining machine.

* * * * *